(12) United States Patent
Eckstein

(10) Patent No.: US 8,484,404 B2
(45) Date of Patent: Jul. 9, 2013

(54) DIGITAL SIGNAL PROCESSING ARCHITECTURE SUPPORTING EFFICIENT CODING OF MEMORY ACCESS INFORMATION

(75) Inventor: Erik Eckstein, Baden (AT)

(73) Assignee: LSI Corporation, Milpitas, CA (US)

( * ) Notice: Subject to any disclaimer, the term of this patent is extended or adjusted under 35 U.S.C. 154(b) by 526 days.

(21) Appl. No.: 12/818,180

(22) Filed: Jun. 18, 2010

(65) Prior Publication Data
US 2011/0314209 A1 Dec. 22, 2011

(51) Int. Cl.
*G06F 12/00* (2006.01)
(52) U.S. Cl.
USPC ............................................................ 711/5
(58) Field of Classification Search
None
See application file for complete search history.

(56) References Cited

U.S. PATENT DOCUMENTS
6,430,648 B1 8/2002 Carnevale

*Primary Examiner* — Brian Peugh
(74) *Attorney, Agent, or Firm* — Raj Abhyanker, P.C.

(57) ABSTRACT

A digital signal processing architecture supporting efficient coding of memory access information is provided. In an example embodiment, a digital signal processor includes an adjustment value register to store an initial adjustment value and a succeeding adjustment value. The digital signal processor may also include an address generator circuit to retrieve an instruction including a memory address value that is greater than N, and a further instruction including a further memory address value that is less than or equal to N. In addition, the digital signal processor may include a memory, which includes a high bank address space defined by memory locations that are uniquely identified with memory address values greater than N. The address generator circuit may access the high bank address space, using initial adjustment value and the memory address value, or using the succeeding adjustment value and the further memory address value.

22 Claims, 10 Drawing Sheets

| ADJUSTMENT VALUE (AV) SEQUENCE 602 | ADJUSTMENT VALUE (AV) ENCODING 604 | INSTRUCTION 606 | RECEIVED ADDRESS (A) ENCODING 608 | OPERATION 610 | GENERATED ADDRESS ENCODING 612 |
|---|---|---|---|---|---|
| INITIAL | VALUE = 0 | MOVE [A32, DEST. ADDRESS] | 32-BIT | A32 + 0 | 32-BIT |
| SUCCEEDING | 32-BIT | MOVE [A16, DEST. ADDRESS] | 16-BIT | A16 + AV32 | 32-BIT |
| SUPERSEDING | 32-BIT | MOVE [A16, DEST. ADDRESS] | 16-BIT | A16 + AV32 | 32-BIT |

VALUES RELATED TO ADDRESS GENERATION OPERATION 600

FIGURE 6

DIGITAL SIGNAL PROCESSING ARCHITECTURE SUPPORTING EFFICIENT CODING OF MEMORY ACCESS INFORMATION

FIELD OF TECHNOLOGY

This disclosure relates generally to a technical field of data processing and, in one example embodiment, to a digital signal processing architecture supporting efficient coding of memory access information and a method of efficient coding of the memory access information.

BACKGROUND

Computing machines and devices carry out instructions to provide functionality. An instruction may include a memory access command that prompts a processor of the computing device to access an electronic storage. The electronic storage may be organized into an address space including unique memory locations that are each accessible with a different memory address. In response to the memory access command, the processor may access the electronic storage at one or more of the different memory addresses.

A memory address may be encoded using a binary number that is expressed with a number of bits. For example, the memory address may be encoded using 8-bits, 16-bits, 32-bits, and/or with another number of bits.

Instructions may be characterized by a code size. The number of bits that encode the memory address to be accessed may affect the code size of a memory access command. The address space may include a region (e.g., a high bank and/or a low bank) in which the memory addresses are encoded using a relatively greater number of bits (e.g., high bank addresses) and/or a relatively fewer number of bits (e.g., low bank addresses). For example, memory access commands to access a high bank address may have a greater code size than memory access command to access a low bank address.

Since instructions are stored and processed, as code size increases, so may a demand on storage and/or energy resources of the computing machine or device. For example the memory access command to access the high bank address may result in consumption of more storage and/or energy resources than would a memory access command to access the low bank address.

SUMMARY

In one aspect, a digital signal processor includes an adjustment value register configured to store an initial adjustment value and a succeeding adjustment value. The digital signal processor also includes an address generator circuit communicatively coupled with the adjustment value register. The address generator circuit may be configured to retrieve an instruction including a memory address value that is greater than N and a further instruction including a further memory address value that is less than or equal to N.

In addition, the digital signal processor includes a memory communicatively coupled with the address generator circuit. The memory may include a high bank address space defined by memory locations that are uniquely identified with memory address values greater than N.

The address generator circuit may be further configured to access the high bank address space, using the initial adjustment value and the memory address value, when the adjustment value register is not storing the succeeding adjustment value. The address generator circuit may be further config-ured to access the high bank address space, using the succeeding adjustment value and the further memory address value, when the adjustment value register is storing a succeeding adjustment value.

The high bank address space may be defined by memory locations that are uniquely identified with memory address values that reflect greater than 65,535 decimal units. The succeeding adjustment value may reflect greater than the 65,535 decimal units, and the further memory address value may reflect less than or equal to the 65,535 decimal units.

The address generator circuit of the digital signal processor may be configured to process the succeeding adjustment value together with the further memory address value to calculate a binary sum of the succeeding adjustment value and the further memory address value.

The address generator circuit of the digital signal processor may be configured to place, during start-up of the digital signal processor, a zero in the adjustment value register as the initial adjustment value, and to process the initial adjustment value together with the memory address value to calculate a binary sum of the initial adjustment value and the memory address value.

The address generator circuit may be communicatively coupled to an instruction module, and responsive to the instruction module requesting storage of the succeeding adjustment value, the address generator circuit may be configured to confirm that the instruction module is permitted to cause the storage of the succeeding adjustment value. The address generator circuit may be further configured to place the succeeding adjustment value in the adjustment value register when the address generator circuit may confirm permission.

In some example embodiments, the instruction module may include a functional task of a machine code, and the further instruction may be associated with that functional task.

The address generator circuit of the digital signal processor may be configured to place the succeeding adjustment value in the adjustment value register responsive to a request from an operating system to do so, the succeeding adjustment value may be used in association with a functional task of a machine code, and the functional task being associated with the further instruction.

The address generator circuit of the digital signal processor may also place a superseding adjustment value in the adjustment value register responsive to a request from the operating system to do so, the superseding adjustment value may be used in association with a different functional task of the machine code, the different functional task being associated with a yet a further instruction including yet a further memory address value that is less than or equal to N. The address generator circuit of the digital signal processor may further access the high bank address space, using the superseding adjustment value and the yet further memory address value, when the adjustment value register may be storing the superseding adjustment value.

In another aspect, a method includes setting an initial adjustment value. The method also includes in an absence of a setting of a succeeding adjustment value, utilizing the initial adjustment value and a storage location value that is greater than N to access a section of a storage. In addition, the method also includes in a presence of the setting of the succeeding adjustment value, utilizing the succeeding adjustment value and a different storage location value that is greater than N to access the section of the storage. The section of the storage being defined by, and accessible with, unique storage location values greater than N and not less than or equal to N.

The method may include placing content of the unique storage location at a destination storage location. The utilizing of the succeeding adjustment value and the different storage location value may include processing the succeeding adjustment value together with the different storage location value to generate a unique storage location value of the unique storage location values. The accessing of the section of the storage may include accessing the section of the storage at a unique storage location identified by the unique storage location value.

The succeeding adjustment value may reflect greater than 65,535 decimal units, the different storage location value may reflect less than or equal to the 65,535 decimal units, and the section of the storage may be defined by storage locations that reflect greater than the 65,535 decimal units.

The utilizing of the succeeding adjustment value and the different storage location value may include retrieving a binary succeeding adjustment value and a binary further storage location value, and adding the retrieved binary succeeding adjustment value to the binary further storage location value.

The setting of the initial adjustment value may include setting the initial adjustment value to zero, and the utilizing of the initial adjustment value and the storage location value may include adding binary numbers representing each of the initial adjustment value and the storage location value.

The setting of the succeeding adjustment value may include setting the succeeding adjustment value in response to a request from an instruction module. The utilizing of the succeeding adjustment value and the different storage location value may include extracting the different storage location value from a memory access instruction, and processing the succeeding adjustment value together with the different storage location value responsive the memory access instruction.

The setting of the succeeding adjustment value may include verifying that the instruction module may be authorized to activate the setting of the succeeding adjustment value, and setting the succeeding adjustment value if authorization of the instruction module may be verified.

The setting of the succeeding adjustment value in response to the request from the instruction module may include setting the succeeding adjustment value in response to a request from a functional task of a machine code. The memory access instruction may be associated with the functional task.

The method may further include setting a superseding adjustment value. The method may also include accessing a different section of the storage via utilizing a superseding adjustment value and yet another storage location value that may be greater than N, the different section of the storage being defined by different unique storage location values that are greater than N and not less than or equal to N.

An operating system may request the setting of the succeeding adjustment value, the memory access instruction may be associated with a functional task of a machine code, and an additional memory access instruction that may include the yet another storage location value may be associated with an additional functional task of the machine code. A machine-readable medium may include instructions that when executed by a machine, may cause the machine to perform the method of claim 1.

In another aspect, a networked digital media system includes an input/output module configured to receive digital media input via a network and output digital media to a user. The networked digital media system also includes a random access memory (RAM) having a high bank address space defined by memory locations uniquely identified with memory address values greater than N. The networked digital media system further includes a digital signal processor communicatively coupled to the RAM and including an adjustment value register configured to store an initial adjustment value and a succeeding adjustment value.

In addition, the networked digital media system includes an address generator circuit communicatively coupled with the adjustment value register and being configured to retrieve an instruction including a RAM address value that is greater than N, and a further instruction including a further RAM address value that is less than or equal to N.

The address generator circuit may further be configured to access the high bank address space, using the initial adjustment value and the RAM address value, when the adjustment value register is not storing the succeeding adjustment value, and access the high bank address space, using the succeeding adjustment value and the further RAM address value, when the adjustment value register is storing a succeeding adjustment value.

The networked digital media system may be selected from the group of devices consisting of a mobile phone, a mobile video device, a mobile audio device, and a mobile audio/visual device.

The high bank address space of the networked digital media system may only include memory locations that may be uniquely identified with memory address values that may reflect greater than 65535 decimal units, the succeeding adjustment value may reflect greater than the 65535 decimal units, and the further memory address value may reflect less than or equal to the 65535 decimal units.

The digital signal processor of the networked digital media system may include a plurality of adjustment value registers and a plurality of address generator circuits, the adjustment value register being one of the plurality of adjustment value registers, and the address generator circuit being one of the plurality of address generator circuits. The plurality of adjustment value registers and address generator circuits may have substantially similar configurations to the adjustment value register and the address generator circuit.

In yet another aspect, a method includes requesting that a specific adjustment value be set in a processor register. The method also includes instructing a processor to access a high bank of memory using a low bank memory address that is less than or equal to N. In addition, the method further includes confirming that the processor has accessed the high bank of memory at a high bank address, the high bank address being based a sum of the specific adjustment value and the low bank memory address. The high bank of memory being defined by memory addresses that are greater than N and not less than or equal to N.

The methods, systems, and apparatuses disclosed herein may be implemented in any means for achieving various aspects, and may be executed in a form of a machine-readable medium embodying a set of instructions that, when executed by a machine, causes the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which:

FIG. 6 is a table illustrating example values related to address generation operations, according to one or more embodiment.

Figure 1:
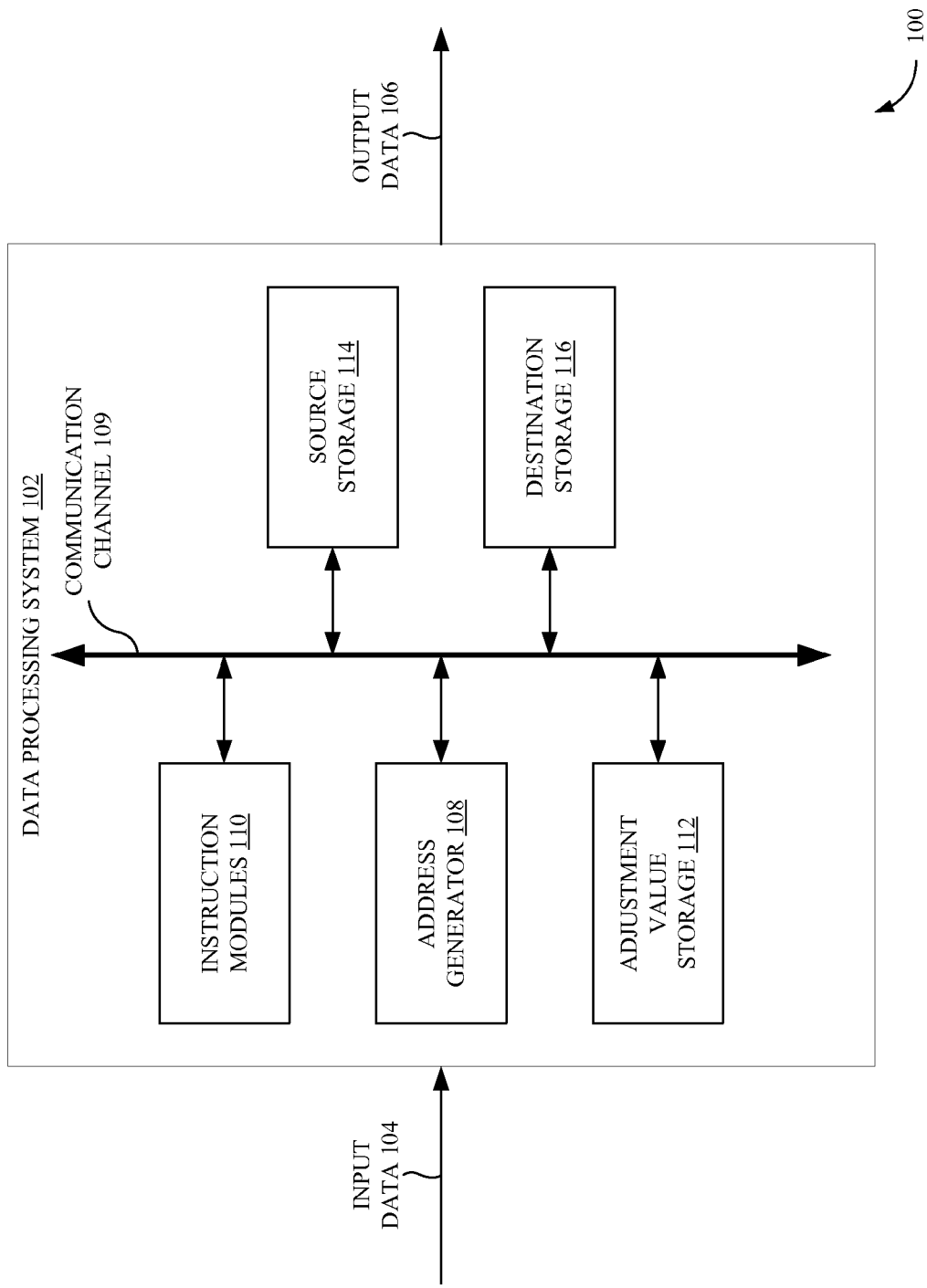
FIG. 1 is a block diagram showing a data processing system, according to example embodiments.

Other features of the present embodiments will be apparent from the accompanying drawings and from the detailed description that follows.

DETAILED DESCRIPTION

Digital signal processing architecture supporting efficient coding of memory access information is disclosed. Although the present embodiments are described with reference to specific example embodiments, it will be evident that various modifications and changes may be made to these embodiments without departing from the broader spirit and scope of the various embodiments.

In an embodiment, the digital signal processing architecture and the method described herein allow usage of both a small encoding variant (e.g., a 16-bit encoding variant) of a memory address and a relatively larger encoding variant (e.g., a 32-bit encoding variant) to access frequently accessed data placed in a high bank section of memory (e.g., memory addresses that are encoded with greater than 16-bits).

In some example embodiments, the digital signal processing architecture may place an adjustment value in a processor register. The processor register may store the adjustment value for use in a memory access operation discussed below. An example adjustment value may have a value of zero or may be a non-zero number N encoded, for example, with greater than 16-bits.

A region of memory referred to as a high bank region of memory may be organized into memory addresses (e.g., high bank memory addresses) that are greater than the number N. For example all of the high bank memory addresses may be encoded with greater than 16 bits.

Responsive to a memory access command, the digital signal processing architecture may instruct a processor to access the high bank region at a high bank memory address using the adjustment value, and a low bank memory address of the memory access command, that is less than or equal to the number N. In this example embodiment, the low bank memory address may be a number encoded with up to the 16-bits (e.g., 16 bits), and an example adjustment value may include another number encoded with greater than the 16-bits (e.g., 32 bits).

Alternatively or additionally, the digital signal processing architecture may instruct a processor to access the high bank region at a high bank memory address using the adjustment value and a high bank memory address of the memory access command. In this alternative or additional embodiment, an example high bank memory address may be a number encoded with greater than 16-bits and an example adjustment value may be a zero value.

The example embodiment above may permit backward compatibility with memory access commands (e.g., issued by a program) that are limited to accessing high bank memory space using the high bank memory address rather than the low bank memory address.

For example, various embodiments described herein may permit access to the high bank of memory in two example scenarios. In the first example scenario, a program may issue a memory access command including a high bank memory address to access a specific high bank memory address. The high bank memory address may be processed with the adjustment value so that the specific high bank memory address may be determined and accessed. In the second example scenario, a different program may issue a different memory access command including a low bank memory address to access a specific high bank memory address. The low bank memory address may be processed with the adjustment value so that the specific high bank memory address may be accessed.

Processing a low bank and/or a high bank memory address with the adjustment value may include various operations. For example, in the first example scenario described above, the specific high bank memory address may be derived or computed based on a sum of the example high bank memory address and an example zero adjustment value. In the second example scenario the specific high bank memory address may be derived or computed based on a sum of the example low bank memory address and an example non-zero adjustment value.

For some example embodiments, the digital signal processing architecture may allow an operating system such as a mobile device operating system to set different adjustment values for different task instructions (e.g., including multiple memory access instructions) such that the derived or computed high bank addresses will be different for the different task instructions. Using the different high bank addresses for the different task instructions may reduce sharing of the high bank addresses within the high bank memory space by multiple tasks instructions. Further example embodiments are discussed in more detail below.

FIG. 1 is a block diagram showing a data processing system 102, according to example embodiments. In accordance with various example embodiments, the digital signal processing architecture disclosed herein may be operatively coupled to a data processing system, which is discussed in more detail below.

Examples, of the data processing system 102 may include, but not be limited to a laptop, a desktop, a digital calculator, a mobile phone, a personal digital assistant, and the like. In example embodiments, the data processing system 102 may be configured to receive an input data 104 and to obtain an output data 106 after processing the input data 104. The input data 104 may be received from one or more users of the data processing system 102. The input data 104 may include, for example an instruction (e.g., move (a16), $r_n$) to perform an operation, data required to execute an instruction, and the like.

In example embodiments, the data processing system 102 may be operatively coupled to an address generator 108 through a communication channel 109. The address generator 108 may be configured to receive one or more instructions (e.g., data access instructions) and/or one or more values (e.g., adjustment values) from one or more users and/or an operating system coupled to the data processing system 102.

In example embodiments, the data processing system 102 may also include an instruction module 110 operatively coupled to the address generator 108 through the communication channel 109. The instruction module 110 may include one or more operating systems and/or one or more sets of codes for a set of instructions. In example embodiments, the address generator 108 may be communicatively coupled to the instruction module 110 and may be responsive to the instruction module 110 requesting storage of one or more adjustment values.

In addition, the data processing system 102 may also include an adjustment value storage 112 to store one or more adjustment values. An adjustment value may be received from the users and/or from the operating system. The address generator 108 may also be configured to set one or more adjustment values from the adjustment value storage 112 to an instruction and use the set adjustment values to generate an address referred by the instruction used to perform the operation. For example, in an operation involving moving a variable from a source storage to a destination storage (e.g., move (a16), $r_n$), the address generator 108 may generate the address of a source storage 114 (e.g. a random access memory, a16) based on the instruction, may add an adjustment value to the address of the source storage 114 to generate an address in a high bank address space in the memory, and may use the generated address to move the variable at the source storage 114 to a destination storage 116 (e.g. register $r_n$). The adjustment value may be set by the operating system while performing a task switch.

Also disclosed herein is a networked digital media system with the digital signal processing architecture embedded therein. The networked digital media system may include, but not limited to, a mobile phone, a mobile video device, a mobile audio device, a mobile audio/visual device.

Figure 2:
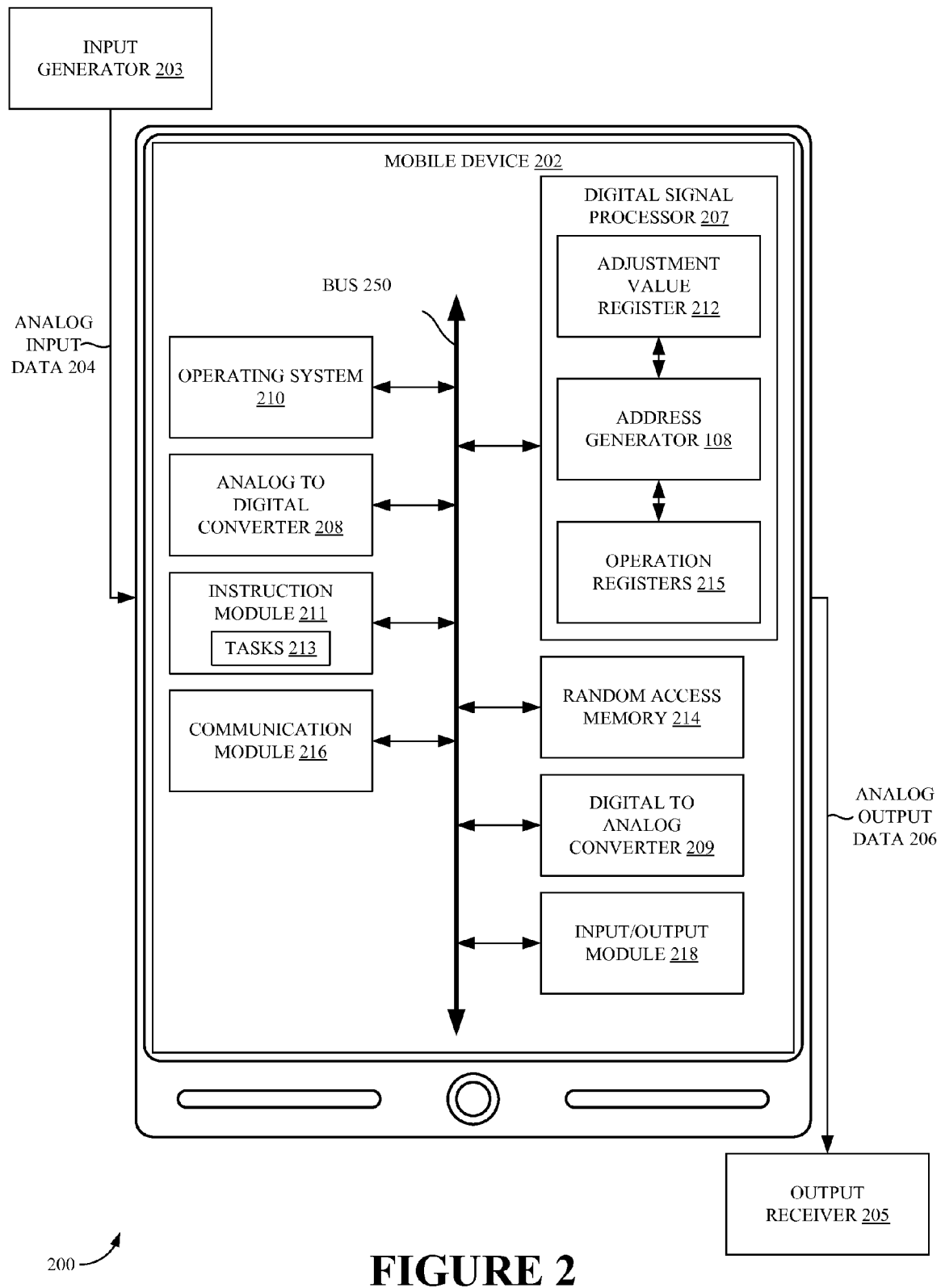
FIG. 2 is a block diagram showing a mobile device, according to example embodiments.

FIG. 2 is a block diagram showing a mobile device 202, according to example embodiments. The network digital media system (e.g., the mobile device 202) may include an input/output module 218 configured to receive digital media input via a network and output digital media to a user. In example embodiments, the mobile device 202 may receive an input data 104 from an input generator 203. The input data 104 may be for example an analog input data 204. In example embodiments, the received analog input data 204 may be fed into an analog to digital converter 208.

The analog to digital converter 208 may convert the received analog input data 204 to a digital value. The digital value may be processed through the mobile device 202 to obtain an output data later converted to an analog output data 206, through a digital to analog converter 209. The analog output data may be transferred to an output receiver 205. In example embodiments, the network digital media system may also include a memory (e.g., a random access memory (RAM) 214) having a high bank address space defined by memory locations uniquely identified with memory address values greater than N.

In example embodiments, N may be for example, 65535 (2016) decimal units and the high bank address space may only include memory locations that are uniquely identified with memory address values that reflect greater than 65535 decimal units, the succeeding adjustment value reflects greater than the 65535 decimal units, and the further memory address value reflects less than or equal to the 65535 decimal units.

The network digital media system may further include a digital signal processor 207 communicatively coupled to the memory (e.g. RAM 214). The digital signal processor 207 may include an adjustment value register 212 configured to store an initial adjustment value (e.g., 0) and/or a succeeding adjustment value (e.g., a 32-bit value).

Further, the digital signal processor 207 may also include an address generator 108 communicatively coupled with the adjustment value register 212 and/or the memory and configured to retrieve an instruction from the instruction module 211 including a memory address value (e.g., a RAM address value) that is greater than N, and a further instruction from the instruction module 211 including a further memory address value (e.g., a RAM address value) that is less than or equal to N. In example embodiments, the address generator 108 may further be configured to access the high bank space in the memory, using the initial adjustment value and memory address value (e.g., a RAM address value), when the adjustment value register 212 is not storing the succeeding adjustment value.

Also, the address generator 108 may be configured to access the high bank space, using the succeeding adjustment value and the further memory address value (e.g., a RAM address value), when the adjustment value register 212 is storing a succeeding adjustment value. Further, the address generator 108 may be configured to process the succeeding adjustment value together with the further memory address value to calculate a binary sum of the succeeding adjustment value and/or the further memory address value. The address generator 108 may be further configured to place, during start-up of the digital signal processor 207, a zero in the adjustment value register as the initial adjustment value, and to process the initial adjustment value together with the memory address value to calculate a binary sum of the initial adjustment value and the memory address value. The address generator 108 may be communicatively coupled to an instruction module 211, and may be responsive to requests from tasks 213 to store the succeeding adjustment value.

The address generator 108 may be configured to confirm that the instruction module is permitted to cause the storage of the succeeding adjustment value, and to place the succeeding adjustment value in the adjustment value register when the address generator 108 has confirmed permission. The instruction module may include a functional task of a machine code, and the further instruction may be associated with the functional task. In example embodiments, the address generator 108 may be configured to place the succeeding adjustment value in the adjustment value register 212 responsive to a request from an operating system 210 to do so.

In example embodiments, the succeeding adjustment value is to be used in association with a functional task of a machine code, and the functional task being associated with the further instruction. The address generator 108 may further be configured to place a superseding adjustment value in the adjustment value register responsive to a request from the operating system 210 to do so, the superseding adjustment value to be used in association with a different functional task of the machine code, the different functional task being associated with yet a further instruction including yet a further memory address value that is less than or equal to N.

The address generator 108 may be furthermore configured to access the high bank space, using the superseding adjustment value and the yet further memory address value, when the adjustment value register is storing the superseding adjustment value. In example embodiments, the digital signal processor 207 may include multiple adjustment value registers and multiple address generators, the adjustment value register 212 being one of the multiple adjustment value registers, and the address generator 108 being one of the multiple address generators.

The multiple adjustment value registers and address generators may have substantially similar configurations to the adjustment value register 212 and the address generator 108. In addition, the adjustment value register when set to 0 may be compatible with all known processing architectures, as the processing architecture would then work as a known digital processing architecture without any adjustment value added to an address of a variable in an operation.

The digital signal processing architecture disclosed herein thereby may be binary backward compatible, to work with software codes, meaning that the digital signal processing architecture disclosed herein is functionally equivalent whether running software that addresses a designated section of high bank memory with low bank address, or running software that addresses the designated section with a high bank address. In addition the mobile device 202 may also include a communication module 216 to control and coordinate communication operations of the mobile device 202.

Figure 3:
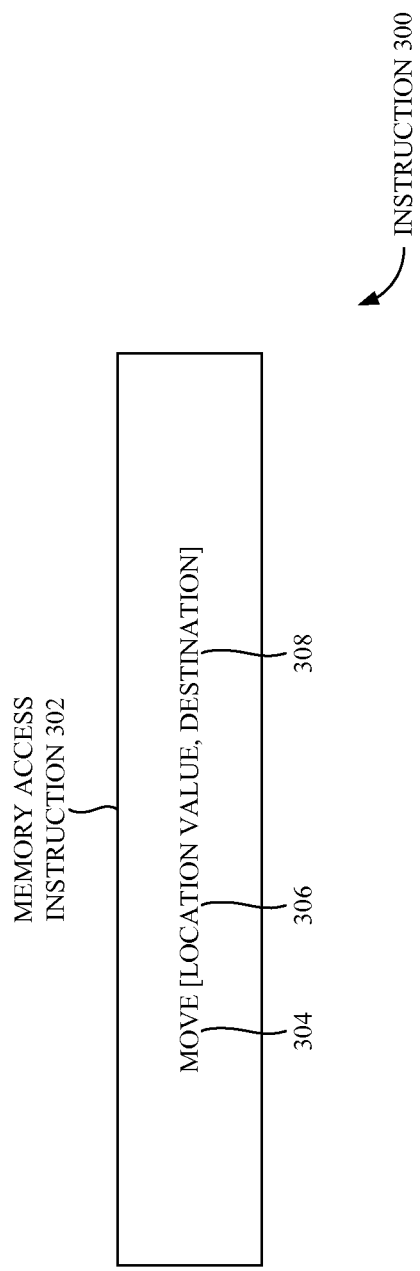
FIG. 3 illustrates an instruction, according to example embodiments.

FIG. 3 illustrates an instruction 300, according to example embodiments. The instruction 300 could be a memory access instruction 302, including for example, the command move (location value, destination). The term move 304 is an operation and may have a code associated therewith. The location value may represent a source address of a variable to be moved to the destination 308 representing address of a location in a memory space. The destination 308 may be a high bank address space within the memory.

The digital signal processing architecture disclosed herein may enable addition of an adjustment value to the location value 306 so as to increase a size of a generated address encoding to access the high bank address space using a small encoding variant (e.g., a 16-bit encoding) and through a direct memory access. As used herein the term direct memory access information may refer to a direct memory access instruction such as a move command, a read command, a write command, or any other memory access instruction.

When the adjustment value is added to the location value 306, the code size of the operation code remains same while increasing the address encoding size, thereby allowing access to a high bank address without compromising on the code size. The code size being may allow for execution of the operation with low memory and power usage, thereby rendering the memory access instruction (e.g., direct memory access instruction) to be efficient.

Figure 4:
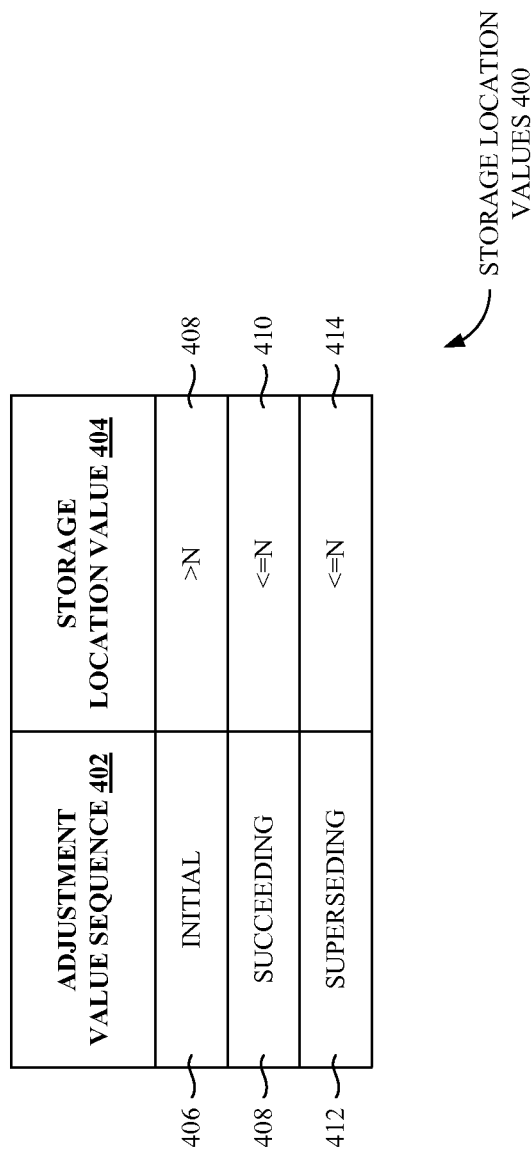
FIG. 4 illustrates storage location values for various adjustment values, according to example embodiments.

FIG. 4 illustrates storage local values 400 for various adjustment values, according to example embodiments. Consider for instance, if for an initial adjustment value 406 in the adjustment value sequence 402, the storage location value 404 is greater than a predetermined value N (e.g., >N) 408, such that greater than N 408 represents a high bank address in a storage location space, then an operation performed using the initial adjustment value may be allowed to access a high bank location in the storage location space. If the initial adjustment value (e.g., 0) is such that the storage location value 404 is less than N, then the operation performed using the initial adjustment value may not be able to access the high bank location in the storage location space. Further, consider a succeeding adjustment value 408 in the adjustment value sequence 402. In example embodiments, the succeeding adjustment value 408 can have a value less than or equal to N.

In accordance with example embodiments, of the method and the digital signal processing architecture disclosed herein, even if an address of a variable used in an operation is such that the storage location value 404 is less than or equal to N (e.g., 410), on adding the succeeding adjustment value 408 to the address of the variable, a resultant storage location value may exceed N and hence an operation performed using the succeeding adjustment value 408 may allow access to the high bank location in the storage location space. Similarly, if an address of a variable used in an operation is such that the storage location value 404 is less than or equal to N 414, on adding a superseding adjustment value sequence 412 to the address of the variable, an access to the high bank location in the storage location space may be allowed during performing an operation. In example embodiments, the superseding adjustment value 412 can have a value less than or equal to N.

Figure 5:
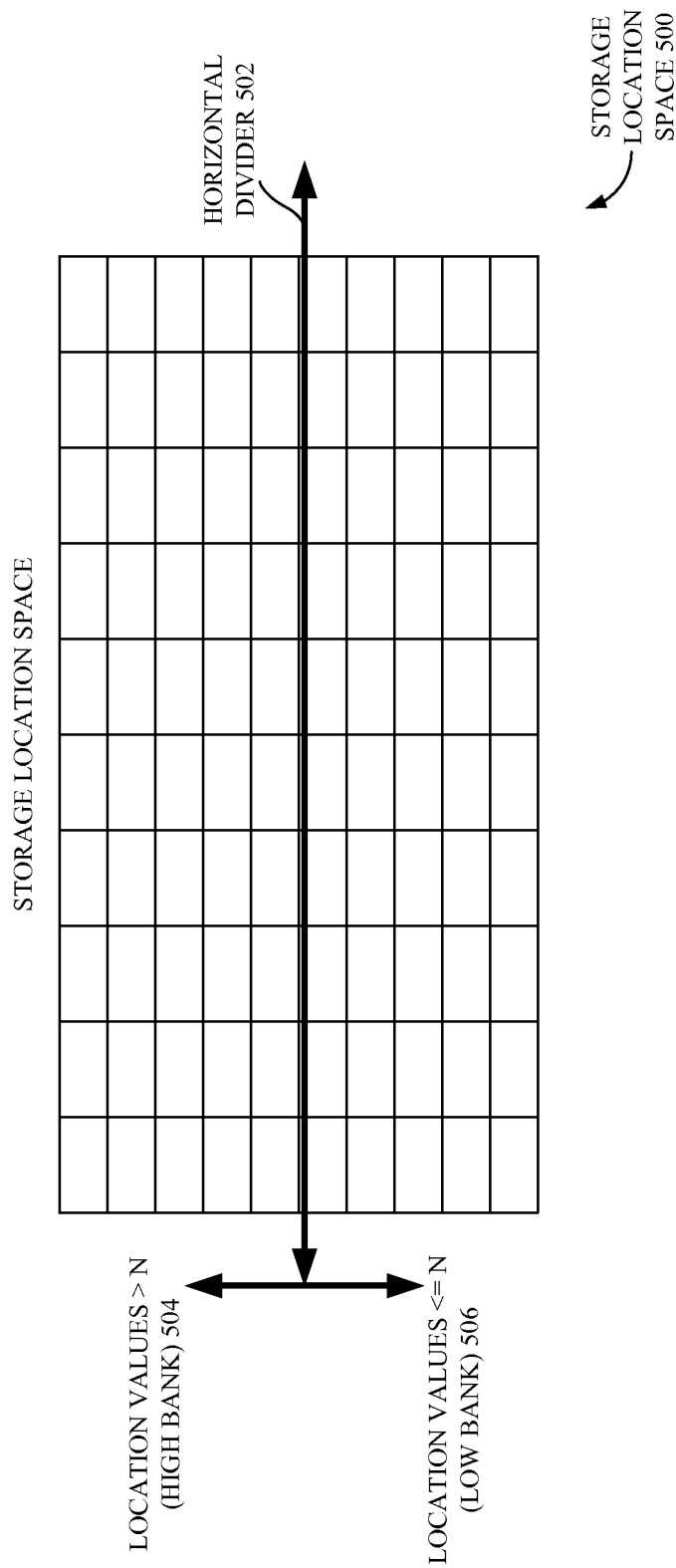
FIG. 5 illustrates a storage location space, according to example embodiments.

FIG. 5 illustrates a storage location space 500, according to example embodiments. The storage location space 500 includes a low bank address space 506 with location values less than or equal to a predetermined value N defined by a horizontal divider 502. Further, the storage location space 500 also includes a high bank address space 504 with location values greater than N. The value N may be a predetermined value, for example, N may be 65535 ($2^{16}$), 4294967286 ($2^{32}$). When a 32-bit succeeding adjustment value 408 is added to the address of the variable (e.g., a 16-bit address), the accessible space in the storage location space 500 increases from 65535 ($2^{16}$) in case of addition of a null initial adjustment value to 4294967286 ($2^{32}$) due to addition of the 32-bit adjustment value.

Consider for example an instruction ADD(A16, $r_n$) to add contents of the address A16 to a register $r_n$. If the instruction is executed on the digital signal processing architecture disclosed herein, before executing the instruction, the operating system 210 may check for any adjustment values for the operation in the adjustment value register 212. On obtaining an adjustment value (e.g., $A_s$), the operating system 210 may add the adjustment value to the address A16, the resultant pointer to a source address would be *(A16+$A_s$). The resultant pointer *(A16+$A_s$) would point to a 32-bit address numerically equivalent to the sum of the address A16 and the adjustment value $A_s$. The operating system 210 then would execute the instruction ADD(A16+$A_s$, $r_n$) by accessing a high bank address space 504 with location values greater than 4294967286 ($2^{32}$) accessible to the operating system 210 for executing the instruction.

FIG. 6 is a table illustrating example values related to address generation operations 600, according to example embodiments. The table illustrates an adjustment value sequence 602. The adjustment value sequence 602 represents zero to N bit locations to encode the adjustment value, N being a predetermined value bifurcating low bank address space 506 and high bank address space 504 within storage location space 500.

Consider a move operation in which the instruction used to perform the move operation through a direct memory access would be MOVE[A32, DEST. ADDRESS], A32 representing a 32-bit source address to fetch a value from and to move the value to a destination address represented by DEST. ADDRESS. Consider for instance, if an initial adjustment value is 0. On adding the initial adjustment value to the 32-bit source address, an address of a location in the high bank address space 504 may be obtained. The receiving address encoding 608 is 32-bit. Since address encoding 604 of the adjustment value is 0 bits (as initial adjustment value is 0), on adding the initial adjustment value to the source address, a generated address encoding 612 would be 32-bit.

Similarly, consider an instruction 606 MOVE[A16, DEST. ADDRESS], with a 16-bit source address A16. When a 32-bit succeeding adjustment value is added to the 16-bit source address, the adjustment value encoding 604 is 32-bit. The received address encoding 608 for the 16-bit address is 16-bit. On adding the 32-bit succeeding adjustment value, the generated address encoding 612 is 32-bit allowing access to $2^{32}$ locations in the storage location space 500 during the operation while less memory may be consumed to execute the operation due to 16-bit received address encoding 608 leading to less overall power consumption. Similarly, when a 32-bit superseding value is added to the 16-bit source address in the operation performed using the instruction MOVE[A16, DEST. ADDRESS] 606, the generated address encoding 612 is 32-bit, leading to an efficient direct memory access operation.

Figure 7A:
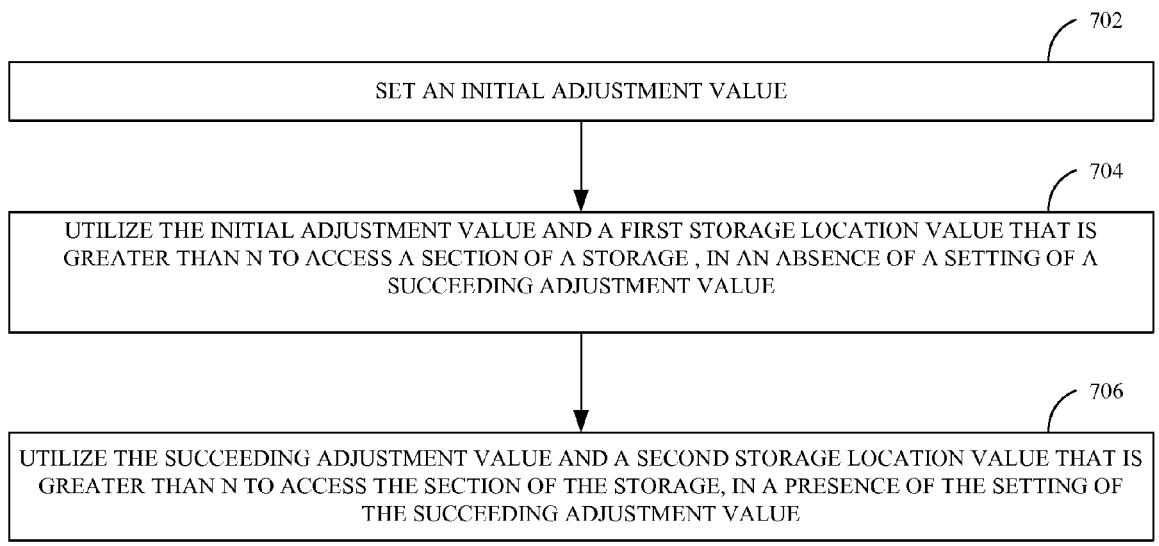
FIGS. 7A-7C illustrate a process flow diagram detailing the operations involved in a method of efficient coding of direct memory access information, according to example embodiments.
Figure 7B:
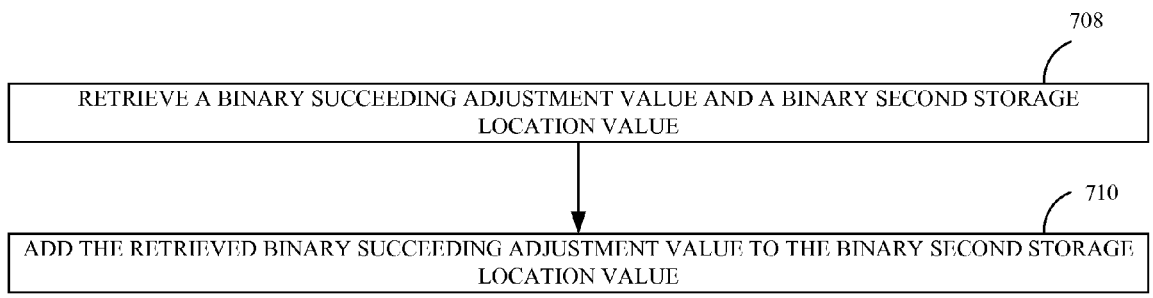
Figure 7C:
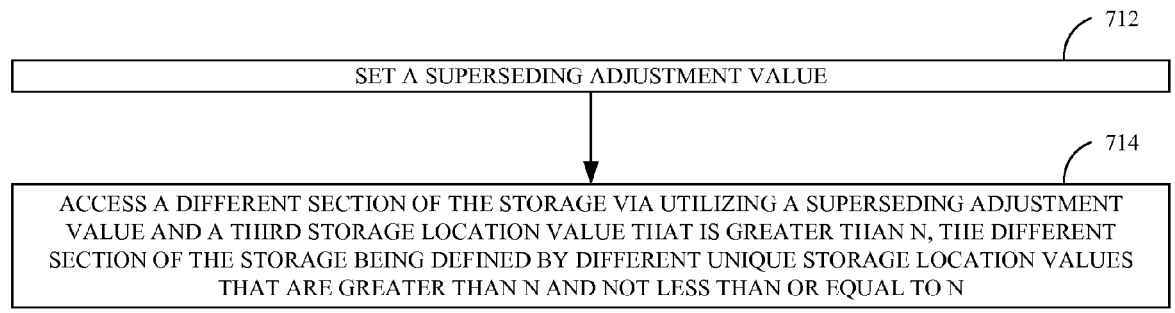

FIGS. 7A-7C illustrate a process flow diagram detailing the operations involved in a method of efficient coding of direct memory access information, according to example embodiments. In operation 702, an initial adjustment value may be set in absence of a setting of a succeeding adjustment value. In example embodiments, the initial adjustment value may be set to zero. In example embodiments, in operation 704, the initial adjustment value and a storage location value that is greater than N may be utilized to access a section of storage, in a presence of the setting of the succeeding adjustment value. During utilization of the initial adjustment value and the storage location value, the binary numbers representing each of the initial adjustment value and the storage location value may be added. In example embodiments, in operation 706, the succeeding adjustment value and a different storage location value that is greater than N may be utilized to access the section of the storage, the section of the storage being defined by, and accessible with, unique storage location values that are greater than N and not less than or equal to N.

The utilizing of the succeeding adjustment value and the different storage location value may include processing the succeeding adjustment value together with the different storage location value to generate a unique storage location value from among one or more unique storage location values. The accessing of the section of the storage includes accessing the section of the storage at a unique storage location identified by the unique storage location value. In example embodiments, a content of the unique storage location may be placed at a destination storage location.

The succeeding adjustment value may reflect greater than 65,535 decimal units, the different storage location value may reflect less than or equal to the 65,535 decimal units, and the section of the storage may be defined by storage locations that reflect greater than the 65,535 decimal units. In example embodiments, during utilizing of the succeeding adjustment value and the different storage location value, in operation 708, a binary succeeding adjustment value and a binary further storage location value may be retrieved.

In example embodiments, in operation 710, the retrieved binary succeeding adjustment value may be added to the binary further storage location value. The succeeding adjustment value may be set in response to a request from an instruction module, and the utilizing of the succeeding adjustment value and the different storage location value may include extracting the different storage location value from a memory access instruction. The succeeding adjustment value together may be processed with the different storage location value responsive to the memory access instruction.

In example embodiments, during setting of the succeeding adjustment value, it may be verified that the instruction module is authorized to activate the setting of the succeeding adjustment value. Further, the succeeding adjustment value may be set if authorization of the instruction module is verified. In example embodiments, the succeeding adjustment value may be set in response to the request from a functional task of a machine code. The memory access instruction may be associated with the functional task.

In example embodiments, in operation 712, a superseding adjustment value may be set. The superseding adjustment value may be utilized to access the high bank address space. In example embodiments, in operation 714, different sections of the storage may be accessed via utilizing a superseding adjustment value and yet another storage location value that is greater than N. The different section of the storage may be defined by different unique storage location values that are greater than N and not less than or equal to N. An operating system may request the setting of the succeeding adjustment value. The memory access instruction may be associated with a functional task of a machine code, and an additional memory access instruction that includes the yet another storage location value may be associated with an additional functional task of the machine code.

In example embodiments, the operating system may request that a specific adjustment value be set in a processor register. A processor may be instructed to access the high bank address space of the memory using the low bank memory address that is less than or equal to N. In example embodiments, it may be confirmed that the processor has accessed the high bank of memory at a high bank address, the high bank address being based a sum of the specific adjustment value and the low bank memory address, and the high bank of memory being defined by memory addresses that are greater than N and not less than or equal to N.

Also disclosed herein is a machine-readable medium including instructions that when executed by a machine, cause the machine to perform the method disclosed herein. The medium readable through the data processing system 102 may be, for example, a memory, a transportable medium such as a CD, a DVD, a Blu-ray™ disc, a floppy disk, or a diskette. The medium may include instructions embodied therein that are executable on the data processing system 102. In example embodiments, a computer program embodying the aspects of the exemplary embodiments may be loaded onto the data processing system 102. The computer program is not limited to specific embodiments discussed above, and may, for example, be implemented in an operating system, an application program, a foreground or background process, a driver, a network stack or any combination thereof. The computer program may be executed on a single computer processor or multiple computer processors.

Figure 8:
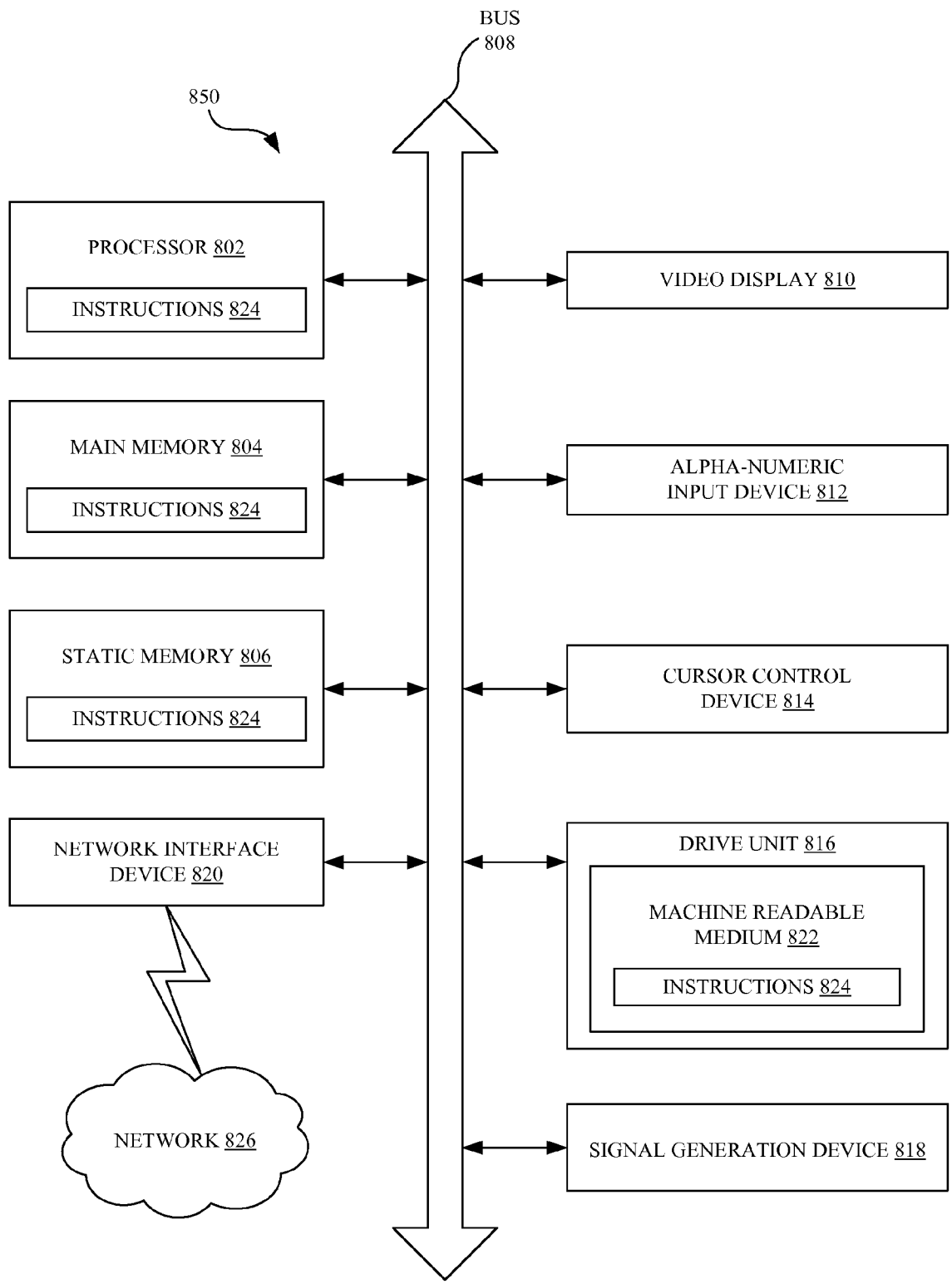
FIG. 8 is a diagrammatic representation of a data processing system capable of processing a set of instructions to perform any one or more of the methodologies herein, according to one embodiment.

FIG. 8 shows a diagrammatic representation of machine in the example form of a computer system 800 within which a set of instructions, for causing the machine to perform any one or more of the methodologies discussed herein, may be executed. In various embodiments, the machine operates as a standalone device and/or may be connected (e.g., networked) to other machines. In a networked deployment, the machine may operate in the capacity of a server and/or a client machine in server-client network environment, and/or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch and/or bridge, an embedded system and/or any machine capable of executing a set of instructions (sequential and/or otherwise) that specify actions to be taken by the machine.

Further, while only a single machine is illustrated, the term "machine" shall also be taken to include any collection of machines that individually and/or jointly execute a set (or multiple sets) of instructions to perform any one and/or more of the methodologies discussed herein.

The example computer system 800 includes a processor 802 (e.g., a central processing unit (CPU) a graphics processing unit (GPU) and/or both), a main memory 804 and a static memory 806, which communicate with each other via a bus 808. The computer system 800 may further include a video display unit 810 (e.g., a liquid crystal display (LCD) and/or a cathode ray tube (CRT)). The computer system 800 also includes an alphanumeric input device 812 (e.g., a keyboard), a cursor control device 814 (e.g., a mouse), a disk drive unit 816, a signal generation device 818 (e.g., a speaker) and a network interface device 820. The disk drive unit 816 includes a machine-readable medium 822 on which is stored one or more sets of instructions (e.g., software 824) embodying any one or more of the methodologies and/or functions described herein. The software 824 may also reside, completely and/or at least partially, within the main memory 804 and/or within the processor 802 during execution thereof by the computer system 800, the main memory 804 and the processor 802 also constituting machine-readable media. The software 824 may further be transmitted and/or received over a network 826 via the network interface device 820.

While the machine-readable medium 822 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding, and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media, and carrier wave signals.

Although the present embodiments have been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

With the above embodiments in mind, it should be understood that example embodiments of the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of example embodiments of the invention are useful machine operations. Example embodiments of the invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The programming modules and software subsystems described herein can be implemented using programming languages such as Flash, JAVA™, C++, C, C#, Visual Basic, JavaScript, PHP, XML, HTML etc., or a combination of programming languages. Commonly available protocols such as SOAP/HTTP may be used in implementing interfaces between programming modules. As would be known to those skilled in the art the components and functionality described above and elsewhere herein may be implemented on any desktop operating system such as different versions of Microsoft Windows, Apple Mac, Unix/X-Windows, Linux, etc., executing in a virtualized or non-virtualized environment, using any programming language suitable for desktop software development.

The programming modules and ancillary software components, including configuration file or files, along with setup files required for providing the method and apparatus for troubleshooting subscribers on a telecommunications network and related functionality as described herein may be stored on a computer readable medium. Any computer medium such as a flash drive, a CD-ROM disk, an optical disk, a floppy disk, a hard drive, a shared drive, and storage suitable for providing downloads from connected computers, could be used for storing the programming modules and ancillary software components. It would be known to a person skilled in the art that any storage medium could be used for storing these software components so long as the storage medium can be read by a computer system.

Example embodiments of the invention may be practiced with other computer system configurations including handheld devices, microprocessor systems, microprocessor-based or programmable consumer electronics, minicomputers, mainframe computers and the like. Example embodiments of the invention may also be practiced in distributing computing environments where tasks are performed by remote processing devices that are linked through a network. Example embodiments of the invention can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion. While example embodiments of the invention have been described, it will be appreciated that those skilled in the art upon reading the specification and studying the drawings will realize various alterations, additions, permutations, and equivalents thereof. It is therefore intended that embodiments of the invention include all such alterations, additions, permutations, and equivalents as fall within the true spirit and scope of the invention as defined in the following claims. Thus, the scope of the invention should be defined by the claims, including the full scope of equivalents thereof.

What is claimed is:

1. A digital signal processor, comprising:
an adjustment value register configured to store an initial adjustment value and a succeeding adjustment value;
an address generator circuit communicatively coupled with the adjustment value register and configured to retrieve an instruction including a memory address value that is greater than N and a further instruction including a further memory address value that is less than or equal to N, N being related to an address range defined by a number of bits utilized to encode a memory address; and a memory communicatively coupled with the address generator circuit and including a high bank address space defined by memory locations that are uniquely identified with memory address values greater than N, the address generator circuit being further configured to:

access the high bank address space, using the initial adjustment value and the memory address value, when the adjustment value register is not storing the succeeding adjustment value, and access the high bank address space, using the succeeding adjustment value and the further memory address value, when the adjustment value register is storing a succeeding adjustment value.

2. The digital signal processor of claim 1, wherein the high bank address space is defined by memory locations that are uniquely identified with memory address values that reflect greater than 65,535 decimal units, the succeeding adjustment value reflects greater than the 65,535 decimal units, and the further memory address value reflects less than or equal to the 65,535 decimal units.

3. The digital signal processor of claim 1, wherein the address generator circuit is configured to process the succeeding adjustment value together with the further memory address value to calculate a binary sum of the succeeding adjustment value and the further memory address value.

4. The digital signal processor of claim 1, wherein the address generator circuit is configured to place, during start-up of the digital signal processor, a zero in the adjustment value register as the initial adjustment value, and to process the initial adjustment value together with the memory address value to calculate a binary sum of the initial adjustment value and the memory address value.

5. The digital signal processor of claim 1, wherein the address generator circuit is communicatively coupled to an instruction module, and responsive to the instruction module requesting storage of the succeeding adjustment value, the address generator circuit is configured to:

confirm that the instruction module is permitted to cause a storage of the succeeding adjustment value, and place the succeeding adjustment value in the adjustment value register when the address generator circuit has confirmed permission.

6. The digital signal processor of claim 5, wherein the instruction module includes a functional task of a machine code, and the further instruction is associated with the functional task.

7. The digital signal processor of claim 5, wherein the address generator circuit is configured to:

place the succeeding adjustment value in the adjustment value register responsive to a request from an operating system to do so, the succeeding adjustment value to be used in association with a first functional task of a machine code, and the first functional task being associated with the further instruction, place a superseding adjustment value in the adjustment value register responsive to a request from the operating system to do so, the superseding adjustment value to be used in association with a second functional task, the second functional task being associated with a yet a further instruction including yet a further memory address value that is less than or equal to N; and access the high bank address space, using the superseding adjustment value and yet the further memory address value, when the adjustment value register is storing the superseding adjustment value.

8. A method comprising:

setting an initial adjustment value;

in an absence of a setting of a succeeding adjustment value, utilizing the initial adjustment value and a first storage location value that is greater than N to access a section of a storage, N being related to an address range defined by a number of bits utilized to encode a storage location; and in a presence of the setting of the succeeding adjustment value, utilizing the succeeding adjustment value and a second storage location value that is less than or equal to N to access the section of the storage, the section of the storage being defined by, and accessible with, unique storage location values that are greater than N and not less than or equal to N.

9. The method of claim 8, further comprising:

placing content of a unique storage location at a destination storage location, wherein the utilizing of the succeeding adjustment value and the second storage location value includes processing the succeeding adjustment value together with the second storage location value to generate a unique storage location value of the unique storage location values, and wherein the accessing of the section of the storage includes accessing the section of the storage at a unique storage location identified by the unique storage location value.

10. The method of claim 8, wherein the succeeding adjustment value reflects greater than 65,535 decimal units, the second storage location value reflects less than or equal to the 65,535 decimal units, and the section of the storage is defined by storage locations that reflect greater than the 65,535 decimal units.

11. The method of claim 8, wherein the utilizing of the succeeding adjustment value and the second storage location value includes:

retrieving a binary succeeding adjustment value and a binary second storage location value, and adding the retrieved binary succeeding adjustment value to the binary second storage location value.

12. The method of claim 8, wherein the setting of the initial adjustment value includes setting the initial adjustment value to zero, and the utilizing of the initial adjustment value and the first storage location value includes adding binary numbers representing each of the initial adjustment value and the first storage location value.

13. The method of claim 8, wherein the setting of the succeeding adjustment value includes setting the succeeding adjustment value in response to a request from an instruction module, and the utilizing of the succeeding adjustment value and the second storage location value includes:

extracting the second storage location value from a memory access instruction, and processing the succeeding adjustment value together with the second storage location value responsive the memory access instruction.

14. The method of claim 13, wherein the setting of the succeeding adjustment value includes:

verifying that the instruction module is authorized to activate the setting of the succeeding adjustment value, and setting the succeeding adjustment value if authorization of the instruction module is verified.

15. The method of claim 13, wherein the setting of the succeeding adjustment value in response to the request from the instruction module includes setting the succeeding adjustment value in response to the request from a functional task of a machine code, and wherein the memory access instruction is associated with the functional task.

16. The method of claim 13, further comprising:
setting a superseding adjustment value; and
accessing a different section of the storage via utilizing a superseding adjustment value and a third storage location value that is greater than N, the different section of the storage being defined by different unique storage location values that are greater than N and not less than or equal to N,
wherein an operating system requests the setting of the succeeding adjustment value, the memory access instruction is associated with a functional task of a machine code, and an additional memory access instruction that includes the third storage location value is associated with an additional functional task of the machine code.

17. A machine-readable medium including instructions that when executed by a machine, cause the machine to perform the method of claim 8.

18. A networked digital media system comprising:
an input/output module configured to receive digital media input via a network and output digital media to a user;
a random access memory (RAM) having a high bank address space defined by memory locations uniquely identified with memory address values greater than N; and
a digital signal processor communicatively coupled to the RAM and including:
an adjustment value register configured to store an initial adjustment value and a succeeding adjustment value; and
an address generator circuit communicatively coupled with the adjustment value register and being configured to retrieve an instruction including a RAM address value that is greater than N, and a further instruction including a further RAM address value that is less than or equal to N, N being related to an address range defined by a number of bits utilized to encode a RAM address, and the address generator circuit being further configured to:
access the high bank address space, using the initial adjustment value and the RAM address value, when the adjustment value register is not storing the succeeding adjustment value, and
access the high bank address space, using the succeeding adjustment value and the further RAM address value, when the adjustment value register is storing a succeeding adjustment value.

19. The networked digital media system of claim 18, wherein the networked digital media system is selected from the group of devices consisting of a mobile phone, a mobile video device, a mobile audio device, and a mobile audio/visual device.

20. The networked digital media system of claim 18, wherein the high bank address space only includes memory locations that are uniquely identified with memory address values that reflect greater than 65535 decimal units, the succeeding adjustment value reflects greater than the 65535 decimal units, and the further RAM address value reflects less than or equal to the 65535 decimal units.

21. The networked digital media system of claim 18, wherein the digital signal processor includes a plurality of adjustment value registers and a plurality of address generator circuits, the adjustment value register being one of the plurality of adjustment value registers, and the address generator circuit being one of the plurality of address generator circuits, and wherein the plurality of adjustment value registers and the plurality of address generator circuits have substantially similar configurations to the adjustment value register and the address generator circuit.

22. A method comprising:
requesting that a specific adjustment value be set in a processor register;
instructing a processor to access a high bank of memory using a low bank memory address that is less than or equal to N, N being related to an address range defined by a number of bits utilized to encode a memory address; and
confirming that the processor has accessed the high bank of memory at a high bank address, the high bank address being based a sum of the specific adjustment value and the low bank memory address, and the high bank of memory being defined by memory addresses that are greater than N and not less than or equal to N.

* * * * *